No. 804,448. PATENTED NOV. 14, 1905.
J. A. BIRDWELL.
LUBRICATING AXLE.
APPLICATION FILED APR. 27, 1905.
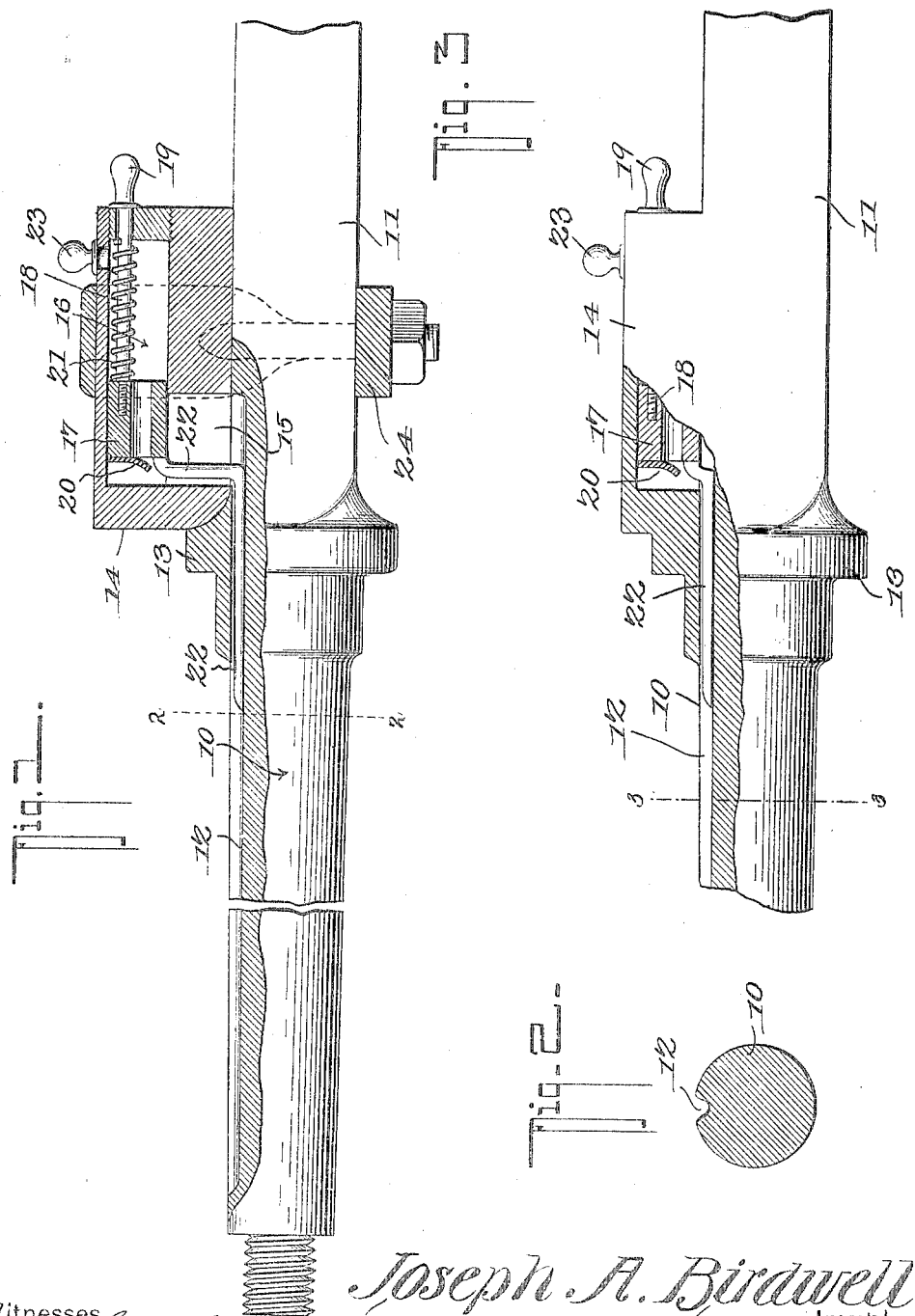

UNITED STATES PATENT OFFICE.

JOSEPH A. BIRDWELL, OF OVERTON, TEXAS.

LUBRICATING-AXLE.

No. 804,448.      Specification of Letters Patent.      Patented Nov. 14, 1905.

Application filed April 27, 1905. Serial No. 257,678.

*To all whom it may concern:*

Be it known that I, JOSEPH A. BIRDWELL, a citizen of the United States, residing at Overton, in the county of Rusk and State of Texas, have invented a new and useful Lubricating-Axle, of which the following is a specification.

This invention relates to vehicle-axles, and has for its object to produce a simply-constructed and efficient attachment, by means of which the lubricant may be forced upon the spindle without the necessity for removing the wheel or otherwise disturbing the running-gear.

With this and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation.

In the drawings thus employed, Figure 1 is a sectional side elevation of one of the spindles and a portion of the axle with the improved device applied. Fig. 2 is a transverse section of the axle-spindle on the line 2 2 of Fig. 1. Fig. 3 is a sectional detail illustrating a modification in the construction.

The spindle 10 of the axle 11 is provided with the usual longitudinal lubricant duct or channel 12, which in the improved structure extends through the stop-collar 13 and for a distance into the axle 11.

Extending above the axle next to the collar 13 is a member 14, having a longitudinal chamber 16 and a branch chamber 15 connecting the same with the inner end of the extension of the duct 12, the member 14 attached to the axle as by a clip 24.

The chamber 16 is provided with an internal plunger 17, having a stem 18 extending through the end of the member 14 and terminating in a handle 19.

The plunger 17 is provided with a longitudinal aperture having a valve 20, and the stem 18 is supplied with a spring 21, operating to maintain the plunger in its projected position.

Extending from the plunger 17 is an arm 22 for projecting into the duct 12 and by its reciprocation preventing the clogging of the same. A feed-aperture leads into the chamber 16 and is closed as by a plug 23, through which the lubricating material is supplied to the receptacle. By this simple means it is obvious that the spindle 10 may be effectually lubricated when required by merely drawing the plunger 17 inwardly by its knob or handle 19 and then releasing it to permit the reaction of the spring 21 to forcibly propel the lubricating material which has passed through the aperture in the plunger in advance of the valve 20, through the cavity 15, and into the duct 12, the arm 22 at the same time clearing the duct from any obstructing gummed lubricant or other foreign matter.

The device is simple in construction, can be inexpensively manufactured, and may be applied by slight and immaterial modifications to any form or size of axle and its spindles.

In event of the "gumming" of the lubricant within the axle a supply of kerosene-oil, gasolene, naphtha, or other similar liquid may be pumped into the oil-duct 15 through the medium of the plunger to clear the spindle from the obstruction.

The member 14 may be formed integral with the axle 11, as shown in Fig. 3, if preferred; but this would not be a departure from the principle of the invention, as will be obvious.

Having fully described the invention, what is claimed is—

1. The combination with an axle-spindle having a longitudinal lubricating-groove, of a lubricant-receptacle associated with the axle and communicating with the groove, a valved plunger mounted to reciprocate in the receptacle, and an arm extending into the groove and secured to and arranged to be positively operated by the plunger.

2. The combination with an axle-spindle having a longitudinal lubricating-groove, of a lubricant-receptacle associated with the axle and communicating with the groove, a valved plunger mounted to reciprocate in the receptacle, a plunger-stem extending through the walls of the receptacle, and an arm extending into the groove and secured to and arranged to be positively operated by the plunger.

In testimony that I claim the foregoing as my own I have hereto affixed my signature in the presence of two witnesses.

JOSEPH A. BIRDWELL.

Witnesses:
A. O. ALFORD,
B. W. BASS.